US006269248B1

(12) United States Patent
Jayawardene

(10) Patent No.: US 6,269,248 B1
(45) Date of Patent: Jul. 31, 2001

(54) METHOD AND APPARATUS FOR PROGRAMMING A CELLULAR LINE ACCESS UNIT UTILIZING AN EXTENSION TELEPHONE

(75) Inventor: Rukshan Mahendra Jayawardene, Richardson, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/017,834

(22) Filed: Feb. 3, 1998

(51) Int. Cl.[7] ................................................ H04Q 7/20
(52) U.S. Cl. ................................ 455/465; 455/418
(58) Field of Search .................................. 455/554, 555, 455/557, 558, 559, 462, 465, 556, 3.01, 74.1, 74.2, 419, 418, 420

(56) References Cited

U.S. PATENT DOCUMENTS

| | | | | |
|---|---|---|---|---|
| 4,674,115 | * | 6/1987 | Kaleita | 379/201 |
| 4,775,997 | * | 10/1988 | West | 379/58 |
| 5,544,223 | * | 8/1996 | Robbins | 379/58 |
| 5,719,918 | * | 2/1998 | Serbetciouglu | 379/58 |
| 5,764,730 | * | 6/1998 | Rabe | 379/58 |
| 5,781,856 | * | 7/1998 | Jacobs | 455/403 |
| 5,825,854 | * | 10/1998 | Larson | 379/67 |
| 5,854,976 | * | 12/1998 | Garcia Aguilera | 455/411 |
| 5,864,763 | * | 1/1999 | Leung | 455/557 |
| 5,892,758 | * | 4/1999 | Argyroudis | 370/335 |

\* cited by examiner

Primary Examiner—Daniel Hunter
Assistant Examiner—Nick Corsaro
(74) Attorney, Agent, or Firm—John D. Crane; Bracewell & Patterson, L.L.P.

(57) ABSTRACT

An extension telephone having a numeric keypad for entering inputs including programming data is connected to a cellular line access unit via an I/O connector. The cellular line access unit, which includes a processor and a memory, stores programming data received from the extension telephone within the memory and accesses the programming data in the memory to establish communication between the extension telephone and a cellular communication network. In a preferred embodiment, programming data that is input utilizing the keypad of the extension telephone is transmitted to the cellular line access unit as a series of dual tone multi-frequency (DTMF) signals, and the cellular line access unit provides feedback in response to the programming data, for example, by generating a tone or displaying a message within a display of the extension telephone.

24 Claims, 3 Drawing Sheets

METHOD AND APPARATUS FOR PROGRAMMING A CELLULAR LINE ACCESS UNIT UTILIZING AN EXTENSION TELEPHONE

BACKGROUND OF THE INVENTION

1. Technical Field

The present invention relates in general to telecommunications and in particular to a method and apparatus for wireless telecommunication. Still more particularly, the present invention relates to a method and apparatus for programming a cellular line access unit utilizing an extension telephone.

2. Description of the Related Art

In many developing countries, there is an increasing demand for access to telephone networks. However, because of the remoteness of many regions of developing countries from existing telephone land lines and because the relatively small number of potential subscribers can render extension of existing land lines to remote regions of developing countries unfeasible, cellular technology has emerged as a cost-effective method of rapidly expanding the availability of access to telephone networks in developing countries.

One type of equipment that can be utilized at a subscriber premises (e.g., a business or residence) in a developing country is a so-called fixed access cellular unit, which is typically too cumbersome to be utilized as a mobile unit and is therefore typically "fixed" at the subscriber premises. Often, such fixed access cellular units have no keypad or display, but merely provide a communication path through which conventional extension telephones can connect to a cellular network. Without a keypad, the on-site programming of a fixed access cellular unit that is necessary to, for example, set the subscriber's telephone number, is conventionally accomplished by an installer utilizing a portable computer that executes specialized programming software.

While a fixed access cellular unit can easily be programmed utilizing a portable computer, often the cost of equipping each installer in a developing country with a portable computer is prohibitive. As should thus be apparent, there exists a need for a simple and inexpensive method and apparatus for on-site programming of a fixed access cellular unit.

SUMMARY OF THE INVENTION

It is therefore one object of the present invention to provide an improved method and apparatus for telecommunication.

It is another object of the present invention to provide an improved method and apparatus for wireless telecommunication.

It is yet another object of the present invention to provide a method and apparatus for programming a cellular line access unit utilizing an extension telephone.

The foregoing objects are achieved as is now described. An extension telephone having a numeric keypad for entering inputs including programming data is connected to a cellular line access unit via an I/O connector. The cellular line access unit, which includes a processor and a memory, stores programming data received from the extension telephone within the memory and accesses the programming data in the memory to establish communication between the extension telephone and a cellular communication network. In a preferred embodiment, programming data that is input utilizing the keypad of the extension telephone is transmitted to the cellular line access unit as a series of dual tone multi-frequency (DTMF) signals, and the cellular line access unit provides feedback in response to the programming data, for example, by generating a tone or displaying a message within a display of the extension telephone.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
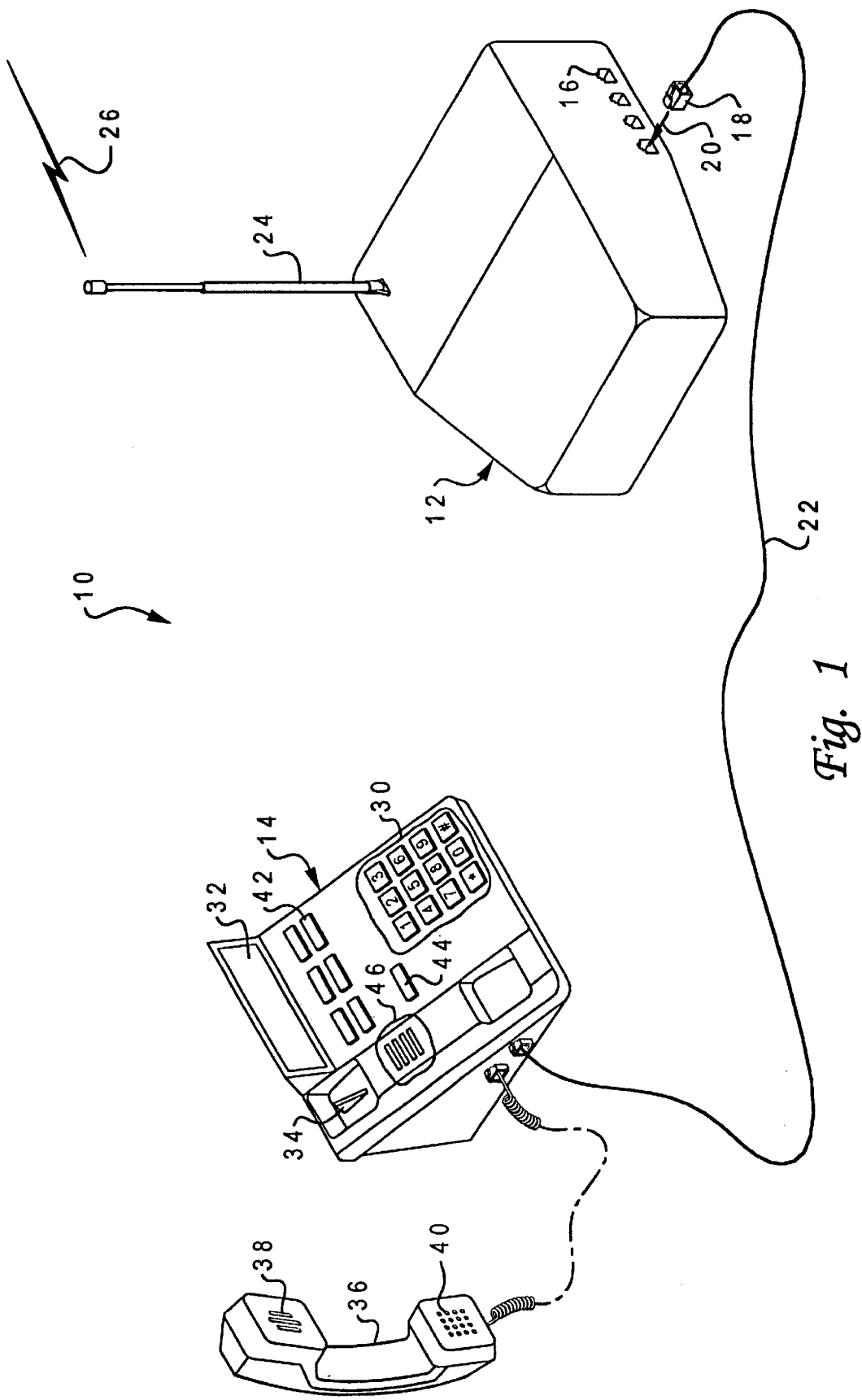
FIG. 1 is a pictorial representation of an apparatus for programming a cellular line access unit in accordance with a preferred embodiment of the present invention.

With reference now to the figures and in particular with reference to FIG. 1, there is illustrated a pictorial representation of an apparatus for programming a cellular line access unit in accordance with a preferred embodiment of the present invention. As depicted, apparatus 10 includes a cellular line access unit (LAU) 12 and a conventional extension telephone 14. In the illustrated embodiment, LAU 12 is a fixed access cellular telephone that is intended for use primarily within a telephone subscriber's premises, such a residence or business. LAU 12 has no keyboard, handset or liquid crystal display (LCD). As such, LAU 12 cannot be used as a stand-alone telephone, but instead provides cellular communication capability to one or more extension telephones plugged into modular jacks 16. Thus, when a connector such as RJ-11 connector 18 is plugged into a modular jack 16 as indicated by arrow 20, signals received by LAU 12 from extension telephone 14 via telephone wire 22 can be processed and output to a cellular communication network via antenna 24 as wireless signals 26. As understood by those skilled in the art, wireless signals 26 may employ any one of a number of conventional wireless communication protocols such as code division multiple access (CDMA), time division multiple access (TDMA), or the like. Similarly, wireless signals 26 received by LAU 12 via antenna 24 are processed and transmitted to extension telephone 14 via telephone wire 22 such that extension telephone 14, which lacks cellular communication capability, is enabled to communicate with a cellular communication network via LAU 12.

In the illustrated embodiment, extension telephone 14 is a conventional business-style telephone including keypad 30, LCD 32, switch hook 34, and handset 36, which includes ear piece 38 and mouth piece 40. In addition, extension telephone 14 includes a number of line select buttons 42 and speaker button 44. As will be understood by those skilled in the art, when handset 36 is off-hook, extension telephone 14 receives voice input via a microphone in mouth piece 40 and directs audio output to a speaker in ear piece 38. On the other hand, when handset 36 is placed in its cradle (i.e., is on-hook) and speaker button 44 has been depressed, extension telephone 14 directs audio output to speaker 46 and obtains voice input utilizing a microphone (not illustrated) built into the body of extension telephone 14. In this manner, speaker button 44 can serve as a secondary switch hook. Conventional extension telephone 14 is preferably implemented utilizing an extension telephone with CLASS capability, for example, the VISTA 250 and 350 telephones manufactured by Nortel Ltd. of Calgary, Alberta, Canada. CLASS, a specification for sending information via FSK modem bursts, is described in detail in the Bellcore specification "Voiceband Data Transmission Interface," Section 6.6 GR-30-CORE, Issue Dec. 1, 1994.

Before LAU 12 can be utilized to establish communication between extension telephone 14 and a cellular communication network, LAU 12 must be programmed with programming data such as an identification number (i.e., telephone number), a system ID (SID) that identifies a "home" cellular communication network, frequency band selection parameters, etc. Because LAU 12 lacks any input device of its own, LAU 12 must be programmed utilizing an external device. According to the present invention, extension telephone 14 is advantageously utilized to program LAU 12, thereby obviating the need to provide and maintain an expensive portable computer for programming LAU 12.

Figure 2:
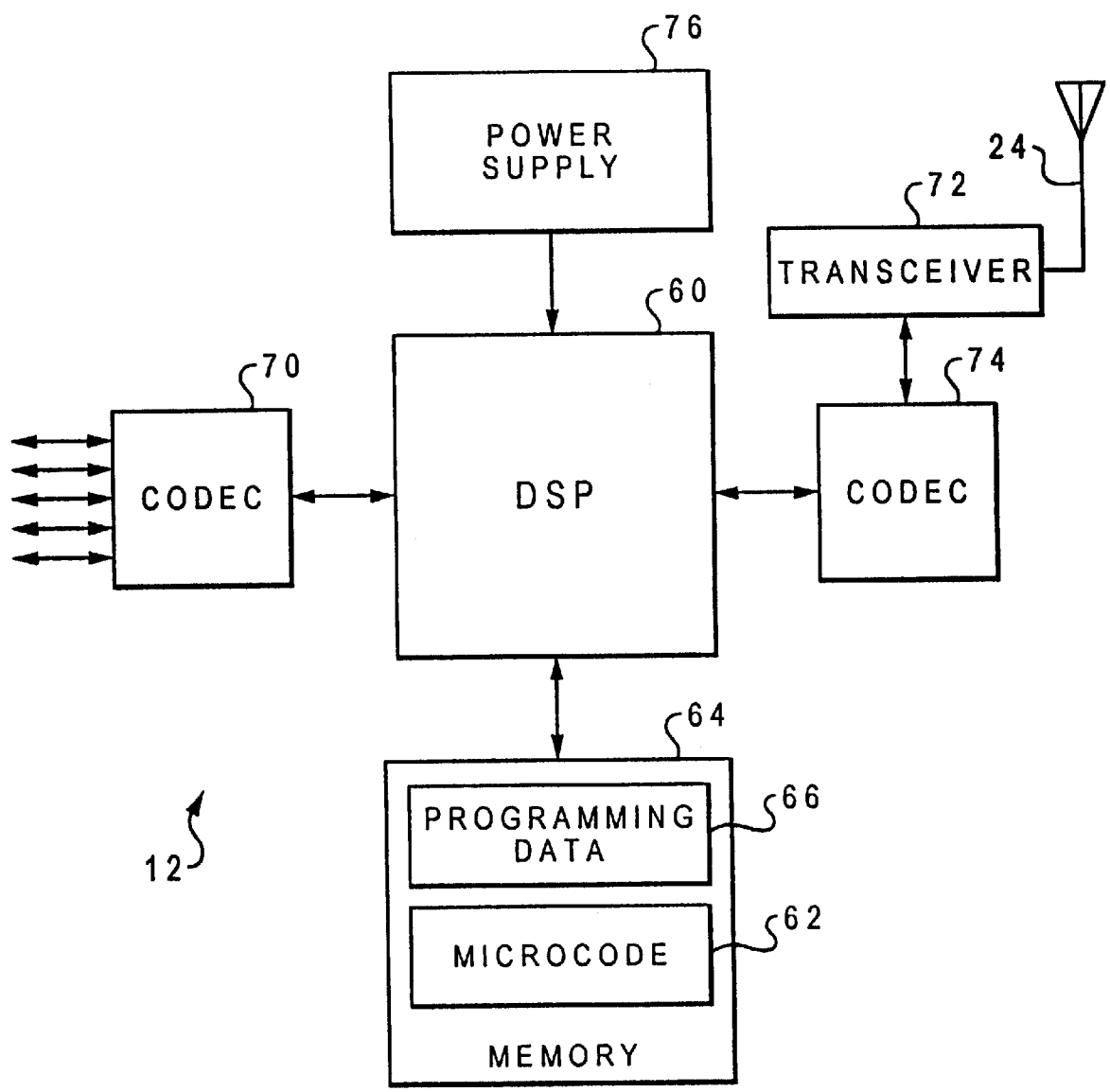
FIG. 2 is a high level block diagram of a cellular line access unit in accordance with a preferred embodiment of the present invention.

Referring now to FIG. 2, there is depicted a high level block diagram of LAU 12 in accordance with a preferred embodiment of the present invention. As illustrated, LAU 12 includes a digital signal processor (DSP) 60 that processes input digital signals under the control of microcode 62 stored within memory 64, which is preferably implemented as an electrically erasable read only memory (EEPROM). Microcode 62 includes program instructions that permit LAU 12 to operate in either a line access mode or in a programming mode. In the line access mode, selected data received by LAU 12 from a cellular communication network is transmitted to extension telephone 14, and selected data received from extension telephone 14 is transmitted to the cellular communication network. When LAU 12 is operating in the programming mode, selected inputs received from extension telephone 14 are stored as programming data 66 within memory 64. As noted above, programming data 66 may include an identification number that uniquely identifies LAU 12 within the cellular communication network, an SID that indicates the home cellular communication network of LAU 12, frequency band selection parameters and so on. It should be understood, however, that the specific programming data 66 required by LAU 12 to establish communication with the cellular communication network is implementation dependent and may vary depending upon the communication protocol employed by the cellular communication network.

Figure 3:
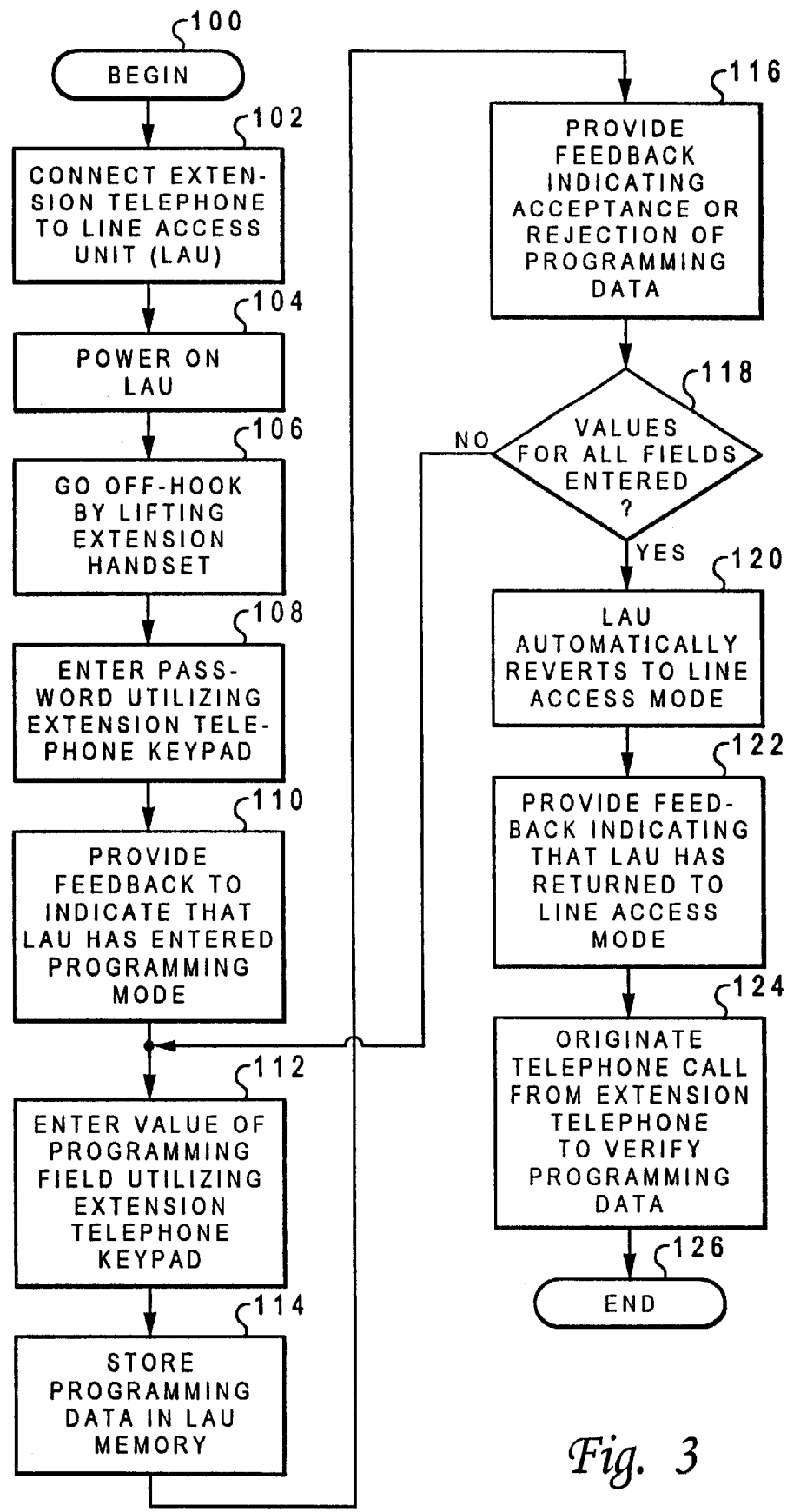
FIG. 3 is a high level logical flowchart of a method of programming a cellular line access unit utilizing an extension telephone in accordance with a preferred embodiment of the present invention.

As shown in FIG. 2, LAU 12 further includes coder/decoder (CODEC) 70, which converts analog inputs received from extension telephone 14 into digital format and converts digital outputs received from DSP 60 into analog format for transmission to extension telephone 14. The analog signals transmitted from extension telephone 14 to LAU 12 include both signals representing voice inputs and dual tone multi-frequency (DTMF) signals representing inputs received via keypad 30. In order to permit communication between LAU 12 and a cellular communication network, LAU 12 further includes antenna 24, transceiver 72, and a second CODEC 74. CODEC 74 converts digital outputs received from DSP 60 into analog signals that are relayed to transceiver 72 and converts the analog outputs of transceiver 72 into digital signals that are relayed to DSP 60. Transceiver 72 both transmits analog signals to and receives analog signals from the cellular communication network via antenna 24. Finally, LAU 12 includes a power supply 76 that supplies power to the components of LAU 12. While FIG. 2 illustrates an embodiment of LAU 12 intended for use in conjunction with an analog cellular communication network, it should be understood that LAU 12 can alternatively be implemented for use in conjunction with a digital personal communication service (PCS) network. Such variation from the embodiment illustrated in FIG. 2 is well within the ability of a person skilled in the art and is accordingly not described further herein With reference now to FIG. 3, there is illustrated a high level logical flowchart of a method of programming a cellular line access unit utilizing an extension phone in accordance with a preferred embodiment of the present invention. As depicted, the process begins at block 100 and thereafter proceeds to block 102, which illustrates connecting extension telephone 14 to LAU 12 by plugging RJ-11 connector 18 into one of modular plugs 26. After LAU 12 has been powered on as shown at block 104, the process proceeds to block 106, which depicts a telephone service technician taking extension telephone 14 off-hook by lifting handset 36 from its cradle or by depressing speaker button 44 while handset 36 is in its cradle. Upon going off-hook, extension telephone 14 transmits an off-hook signal to LAU 12. In response to receipt of the off-hook signal by LAU 12, microcode 62 within LAU 12 enables detection of DTMF signals. Next, as depicted at block 108, the telephone service technician enters a programming password utilizing keypad 30 of extension telephone 14. The programming password, which can include any number of digits, asterisks (*) and pound signs (#), is transmitted to LAU 12 as a series of DTMF signals. In response to recognition of the series of DTMF signals as the programming password, microcode 62 executed by DSP 60 does not forward the DTMF signals to the cellular communication network, but instead provides feedback to the telephone service technician to indicate that LAU 12 has changed from the line access mode to the programming mode, as shown at block 110. The feedback provided at block 110 can be given in any number of formats, depending upon the implementation of LAU 12 and the capabilities of extension telephone 14. In the simplest case, LAU 12 provides feedback by transmitting a single beep to extension telephone 14 via telephone wire 22. The beep is presented at ear piece 38 if handset 36 is out of its cradle and is presented via speaker 46 if handset 36 is in its cradle. In a second embodiment in which LAU 12 is equipped with a linear predictive coding (LPC) chip that stores digitized voice messages, the feedback provided at block 110 is supplied through the presentation of an appropriate digitized voice message, such as "entered programming mode." In a third embodiment in which extension telephone 14 has spontaneous call waiting identification (SQUID) capability (e.g., like that provided by the VISTA 250 and 350 telephones mentioned supra), the feedback provided at block 110 can be in the form of a message displayed within LCD 32. In this embodiment, LAU 12 transmits a SQUID message to extension telephone 14 including a name field that specifies the desired message (e.g., "entered programming mode") and a telephone number field that is left blank. In response to receipt of the SQUID message, extension telephone 14 will present a CAS (Customer Premises Equipment Alerting Signal) tone at ear piece 38 or speaker 46 and display the message contained in the SQUID name field. In a fourth embodiment in which extension telephone 14 is an analog display service interface (ADSI) capable telephone, the feedback message can be transmitted to extension telephone 14 as an ADSI text string that is displayed within LCD 32.

The process then proceeds from block 110 to block 112, which illustrates the telephone service technician entering the value of a programming field utilizing keypad 30 of extension telephone 14. The programming field for which programming data is entered at block 112 can either be predetermined, that is, specified in the programming documentation provided to the telephone service technician, or alternatively, can be indicated by either an audible or textual prompt provided by LAU 12. If the programming data entered by the telephone service technician at block 112 is within an acceptable range of values and has the correct format (e.g., contains the appropriate number of digits or symbols), LAU 12 stores the entered value of the programming field in memory 64 as programming data 66. Next, the process passes to block 116, which depicts LAU 12 providing feedback indicating the acceptance or rejection of the programming data entered by the telephone service technician. The feedback provided at block 116 may take the form of an audible or displayed message requesting the user to confirm the entered value by depressing a key within keypad 30 or, alternatively, a preselected number of beeps presented at ear piece 38 or speaker 46. LAU 12 then determines at block 118 whether values have been entered for all required programming fields. If not, the process returns to block 112, which as been described. If values for all programming fields have been entered, LAU 12 automatically reverts to the line access mode as depicted at block 120 and provides feedback at block 122 to indicate that LAU 12 has returned to the line access mode. As before, the feedback provided at block 122 may take the form of a predetermined number of beeps (e.g., 3 beeps), a synthesized voice message, or a message displayed within LCD 32. The telephone service technician may then originate a telephone call from extension telephone 14 as illustrated at block 124 in order to verify that programming data 66 is correct. Thereafter, the process terminates at block 126.

As has been described, the present invention provides an improved method and apparatus for programming a cellular line access unit. By programming the line access unit to recognize DTMF inputs received from an extension telephone as programming data, the cellular line access unit can be easily programmed on-site without using a portable computer.

While the invention has been particularly shown and described with reference to a preferred embodiment, it will be understood by those skilled in the art that various changes in form and detail may be made therein without departing from the spirit and scope of the invention. For example, although aspects of the present invention have been described supra with respect to specific method steps, those skilled in the art will appreciate from the foregoing description that an alternative embodiment of the present invention may be implemented as a program product for use by a cellular line access unit. A program product in accordance with the present invention can be embodied in a variety of signal-bearing media that include without limitation: (a) information permanently stored on non-writable storage media (e.g., CD-ROM); (b) information alterably stored on writable storage media (floppy diskettes, hard disk drives, or memory devices); or (c) information conveyed via communication media, such as through a computer or telephone network. It should be understood, therefore, that such signal-bearing media, when carrying program instructions that direct the method functions of the present invention, represent alternative embodiments of the present invention.

What is claimed is:

1. A method of programming a cellular line access unit, said method comprising:

connecting an extension telephone to said cellular line access unit, said extension telephone including a numeric keypad;

programming said cellular line access unit by entering programming data utilizing said numeric keypad of said extension telephone, said programming data including at least one a telephone number by which said cellular line access unit is accessed via a cellular communication network;

thereafter, persistently storing said programming data within said cellular line access unit in persistent memory; and supplying feedback to confirm acceptance of or to reject at least a portion of said programming data, wherein supplying feedback comprises:

supplying one or more tone signals to said extension telephone; and in response to receipt of said one or more tone signals by said extension telephone, presenting one or more tones at said extension telephone.

2. The method of claim 1, and further comprising taking said extension telephone off-hook prior to programming said cellular line access unit.

3. A method of programming a cellular line access unit, said method comprising:

connecting an extension telephone to said cellular line access unit, said extension telephone including a numeric keypad and an alphanumeric display;

programming said cellular line access unit by entering programming data utilizing said numeric keypad of said extension telephone, said programming data including at least one a telephone number by which said cellular line access unit is accessed via a cellular communication network;

thereafter, persistently storing said programming data within said cellular line access unit in persistent memory; and supplying feedback to confirm acceptance of or to reject at least a portion of said programming data, wherein supplying feedback comprises displaying a feedback message utilizing said alphanumeric display.

4. The method of claim 3, and further comprising displaying a prompt for programming data utilizing said alphanumeric display.

5. The method of claim 1, and further comprising:

changing an operating mode of said cellular line access unit from a cellular line access mode into a programming mode by entering a predetermined password utilizing said numeric keypad.

6. The method of claim 5, and further comprising:

presenting an audio or visual indication of said operating mode of said cellular line access unit.

7. The method of claim 1, wherein programming said cellular line access unit comprises:

transmitting said programming data from said extension telephone to said cellular line access unit as dual tone multi-frequency (DTMF) signals.

8. The method of claim 1, wherein connecting an extension telephone to said cellular line access unit comprises connecting said extension telephone to said cellular line access unit via a RJ-11 compatible connector.

9. An apparatus for communicating with a cellular communication network, said apparatus comprising:

an extension telephone having a numeric keypad for entering inputs including programming data, said extension telephone including an input/output (I/O) connector;

a cellular line access unit having an I/O connector connected to said I/O connector of said extension telephone, said cellular line access unit including a processor and a persistent memory capable of storing programming data, wherein said processor stores programming data received from said extension telephone within said persistent memory and accesses said programming data in said persistent memory to establish communication between said extension telephone and the cellular communication network, said programming data including at least a telephone number by which said cellular line access unit is accessed via the cellular communication network; and means for supplying feedback to confirm acceptance of or reject at least a portion of said programming data, said means for supplying feedback comprising:

means, within said cellular line access unit, for supplying one or more tone signals to said extension telephone; and a speaker in said extension telephone that, in response to receipt of said one or more tone signals, produces one or more tones.

10. The apparatus of claim 9, said extension telephone further comprising a switch hook having an on-hook position and an off-hook position, wherein said keypad can be used to enter said programming data only when said switch hook is in said off-hook position.

11. An apparatus for communicating with a cellular communication network, said apparatus comprising:

an extension telephone having a numeric keypad for entering inputs including programming data, said extension telephone including an inout/output (I/O) connector and an alphanumeric display;

a cellular line access unit having an I/O connector connected to said I/O connector of said extension telephone, said cellular line access unit including a processor and a persistent memory capable of storing programming data, wherein said processor stores programming data received from said extension telephone within said persistent memory and accesses said programming data in said persistent memory to establish communication between said extension telephone and the cellular communication network, said programming data including at least a telephone number by which said cellular line access unit is accessed via the cellular communication network; and means for supplying feedback to confirm acceptance of or reject at least a portion of said programming data, wherein said feedback is displayed as feedback message within said alphanumeric display.

12. The apparatus of claim 11, and further comprising means for displaying a prompt for programming data utilizing said alphanumeric display.

13. The apparatus of claim 9, and further comprising:

means for changing an operating mode of said cellular line access unit from a cellular line access mode into a programming mode by entering a predetermined password utilizing said numeric keypad.

14. The apparatus of claim 13, and further comprising:

means for presenting an audio or visual indication of said operating mode of said cellular line access unit.

15. The apparatus of claim 9, wherein said extension telephone further comprises:

means, responsive to entry of said programming data via said keypad, for generating dual tone multi-frequency (DTMF) signals for transmission to said cellular line access unit.

16. The apparatus of claim 9, wherein said I/O connector of said cellular line access unit is a RJ-11 compatible connector.

17. A program product executable within a cellular line access unit for programming the cellular line access unit utilizing an extension telephone having a numeric keypad, said program product comprising:

line access unit programming code, including:

instruction means for receiving, within said cellular line access unit, programming data from the extension telephone;

instruction means for persistently storing said programming data within a memory within said cellular line access unit, said programming data including at least one a telephone number by which said cellular line access unit is accessed via a cellular communication network;

instruction means for supplying feedback to confirm acceptance of or reject at least a portion of said programming data, wherein said instruction means for supplying feedback comprises instruction means, within said cellular line access unit, for supplying one or more tone signals to said extension telephone; and a signal-bearing medium bearing said line access unit programming code.

18. A program product executable within a cellular line access unit for programming the cellular line access unit utilizing an extension telephone having a numeric keypad, said program product comprising:

line access unit programming code, including:

instruction means for receiving, within said cellular line access unit, programming data from the extension telephone;

instruction means for persistently storing said programming data within a memory within said cellular line access unit, said programming data including at least one a telephone number by which said cellular line access unit is accessed via a cellular communication network;

instruction means for supplying feedback to confirm acceptance of or reject at least a portion of said programming data, wherein said instruction means for supplying feedback comprises instruction means for causing a feedback message to be displayed within an alphanumeric display of said extension telephone.

19. The program product of claim 18, said line access unit programming code further comprising instruction means for displaying a prompt for programming data within the alphanumeric display of the extension telephone.

20. The program product of claim 17, said line access unit programming code further comprising:

instruction means for changing an operating mode of said cellular line access unit from a cellular line access mode into a programming mode in response to entry of a predetermined password utilizing the numeric keypad of the extension telephone.

21. The program product of claim 14, said line access unit programming code further comprising:

instruction means for presenting an audio or visual indication of said operating mode of said cellular line access unit.

22. The program product of claim 17, said instruction means for receiving said programming data comprising instruction means for receiving dual tone multi-frequency (DTMF) signals as said programming data.

23. The method of claim 1, wherein programming said cellular line access unit is performed prior to any communication between said cellular line access unit and the cellular communication network.

24. The apparatus of claim 9, wherein said cellular line access unit requires said programming data to establish any communication with the cellular communication network.

* * * * *

UNITED STATES PATENT AND TRADEMARK OFFICE
CERTIFICATE OF CORRECTION

PATENT NO. : 6,269,248 B1  
DATED : July 31, 2001  
INVENTOR(S) : Jayawardene

Page 1 of 1

It is certified that error appears in the above-identified patent and that said Letters Patent is hereby corrected as shown below:

<u>Column 7,</u>  
Line 43, delete the word "inout/output" and replace it with the word -- input/output --.

Signed and Sealed this

Second Day of April, 2002

*Attest:*

*Attesting Officer*

JAMES E. ROGAN  
*Director of the United States Patent and Trademark Office*